United States Patent [19]
Ross

[11] 3,920,423
[45] *Nov. 18, 1975

[54] POLYMERIC STEAM SCRUBBER TO CONTROL PARTICULATES

[76] Inventor: Samuel Scott Ross, 1570 Sunset Strip, Mountain Home, Idaho 83648

[*] Notice: The portion of the term of this patent subsequent to Dec. 18, 1990, has been disclaimed.

[22] Filed: Jan. 14, 1974

[21] Appl. No.: 433,040

[52] U.S. Cl. ............... 55/103; 55/263; 55/127; 55/459
[51] Int. Cl. ............................................. B01d 50/00
[58] Field of Search ............ 55/263, 127, 101, 103, 55/459

[56] References Cited
UNITED STATES PATENTS

| | | | |
|---|---|---|---|
| 3,493,109 | 2/1970 | Carta | 55/127 |
| 3,678,659 | 7/1972 | Schouw et al. | 261/116 |
| 3,744,221 | 7/1973 | Ross | 55/263 |

Primary Examiner—Bernard Nozick
Attorney, Agent, or Firm—John W. Kraft; Charles L. Kraft, II

[57] ABSTRACT

The present invention relates employs polymeric materials having a high electrostatic potential, and low heat deformation to exploit electrostatic characteristics of particulates passing in air stream. The present invention is applicable with particular advantage to steam scrubbers.

4 Claims, 3 Drawing Figures

POLYMERIC STEAM SCRUBBER TO CONTROL PARTICULATES

FIELD OF INVENTION

The present invention relates to gas separators, and more particularly to an improved tank construction for steam scrubbers.

BACKGROUND OF THE INVENTION

The present invention is related to steam scrubbers disclosed in my U.S. Pat. Nos. 3,744,221 and 3,778,981. These scrubbers relate to avocation of steam in a closed environment to remove particulate aerosols from exhaust gases. In the present invention it is an important principal that all particules have a charge on the surface and that efficiency of scrubbers including cyclones may be increased in efficiency by exploiting the charged characteristics of both the steam and the particulates. Natural steam and particulates inherently have a strong positive charge, while the walls of a polymeric surface subjected to a flow of air will tend to have a strong negative charge. A scrubber employing steam and fabricated of a polymeric material maybe employed such that they will provide opposite charges and will agglomerate particulates carried in an air stream to further facilitate hydrophoresis and thermophoresis known to occur in the scrubber. Accordingly, it is an object of the present invention to provide an improved tank construction for particulate scrubbers including steam scrubbers and cyclones wherein charged characteristics of the closed environment and of the tank construction facilitate separation of particulates from the gas.

It is another object of this invention to provide an improved tank construction employing aforesaid charge characteristics in both steam and non-steam scrubbers and in pressurized and ambiant pressure separators.

These and other objects shall become apparent from the description following, it being understood that modifications may be made without affecting the teachings of the invention here set out.

SUMMARY OF THE INVENTION

The present invention relates employs polymeric materilas having a high electrostatic potential, and low heat deformation to exploit electrostatic characteristics of particulates passing in air stream. The present invention is applicable with particular advantage to steam scrubbers.

A more thorough and comprehensive understanding may be had from the detailed description of the preferred embodiment when read in connection with the drawings forming a part of this specification.

DESCRIPTION OF THE PREFERRED EMBODIMENT

Figure 1:
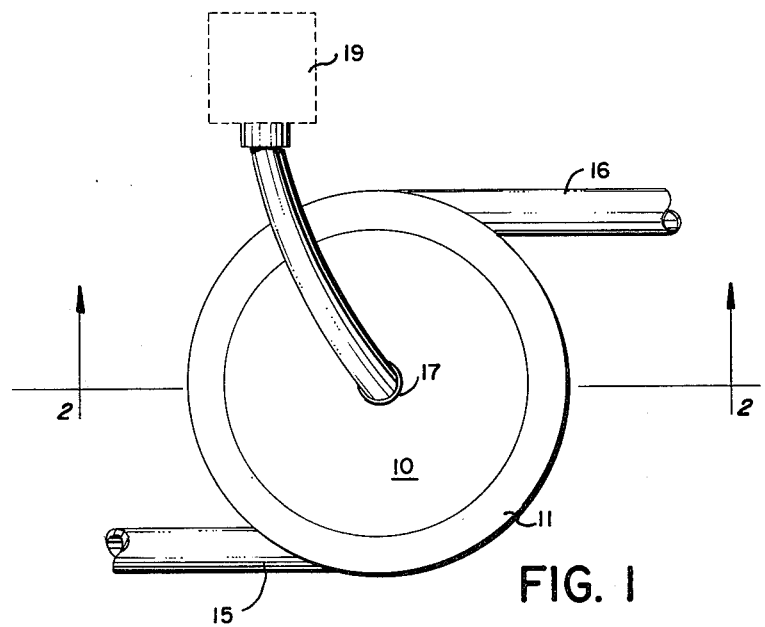
FIG. 1 is a top plan view of a typical steam scrubber employing the tank construction of this invention shown with inlet and exit conduits, and with a source of steam shown in broken lines for illustrative purposes.
Figure 2:
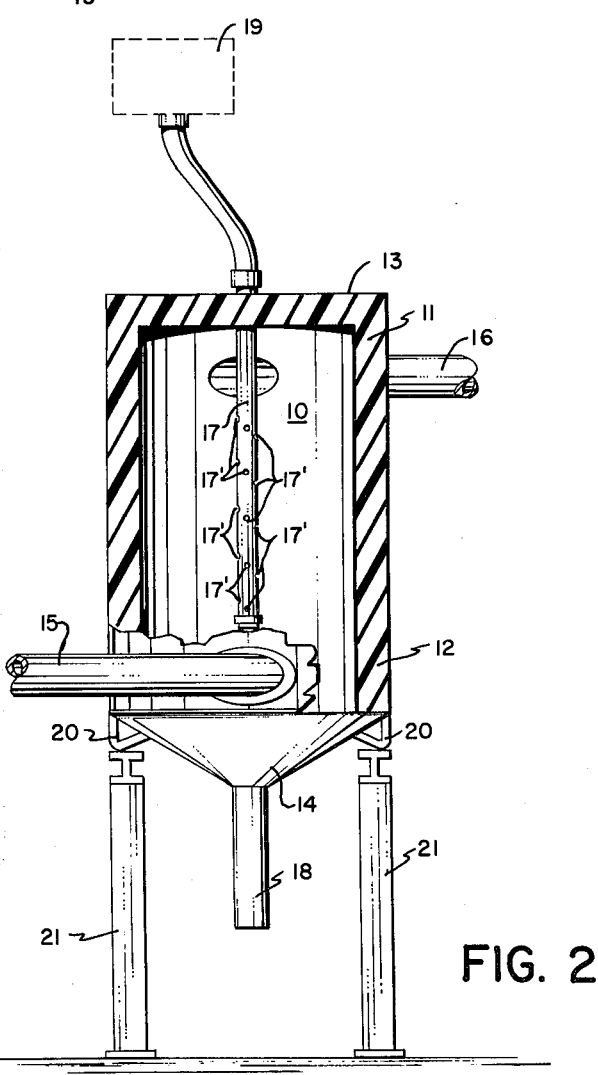
FIG. 2 is a cross-sectional view taken along lines 2—2 of FIG. 1 detailed description of the preferred embodiment.
Figure 3:
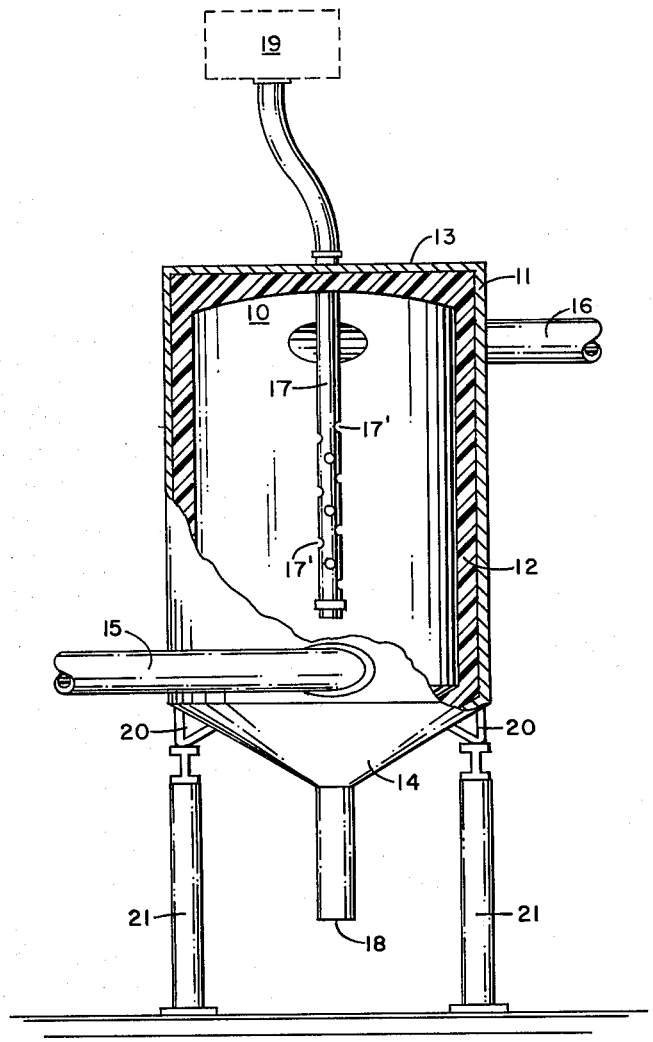
FIG. 3 is a cross-sectional, elevational view taken substantially along the lines 2—2 of the FIG. 1 showing to advantage a further embodiment of the present invention which is substantially in the same form as the FIG. 2.

Referring now to the FIGS. 1 and 2, the tank construction of this invention is shown to advantage identified by the numeral 10. Construction 10 may employ a steam scrubber structure of the type disclosed in my earlier patents referred to above. That scrubber structure comprises a tank 11 having substantially cylindrical side walls 12, a flat top wall 13, and a conical bottom wall 14; a gas inlet conduit or duct 15 entering tangently the lower portion of the cylindrical walls 12; an exit duct or conduit 16 issuing tangently distally from the uppermost terminal end of the cylindrical walls 12 and a steam injector 17. The lowest point in the conical 14 includes a drain 18. The steam injector 17 is mounted at the center of the top wall 13 and may be supplied from a source 19. The injector 17 may be a conduit provided with a multiplicity of holes issuing through the rectilinear center of the tank 11. It has been found that efficiency in the steam scrubber may be increased if the holes 17' are disclosed entirely below the entranceway of the exit conduit 16.

The invention described herein may also be used with a steam injector of the type described in the applications by E. K. Kooser Ser. Nos. 3,608,810 and 3,608,820, both filed Dec. 5, 1968. Such a generator may employ the principal of generating steam by the pressure differential at a preselected temperature from a nozzle type injector. This invention may also apply to scrubbers employing gaseous polyelectrolytes of the type described in U.S. Pat. Nos. 3,608,820 and 3,608,810 issued to E. K. Kooser.

The present tank construction 10 is fabricated of a polymeric material having a high electrostatic potential and low heat deformation. It shall become evident, characteristics of low chemical resistivity are important to long life of the present construction. Materials including polysulsone having dielectric constant of 3.13 (at $10^3$ cyc) and a temperature resistivity of 300° to 345° F., polyethylene sulphites having dielectric constant of 3.79 (at $10^3$ cyc) and temperature resistivity of 400° to 500° F., certain polyesters which are glass reinforced having dielectric constant of 4.0 to 6.0 (at $10^3$ cyc) and heat resistance to 300° to 350° F., or polyester alcoholites glass reinforced having dielectric constant of 5.4 to 7.4 (at $10^3$ cyc) and heat resistivity of approximately 450° F., suggest themselves. Exemplar materials here listed have good chemical resistivity and are flame resistant. The tank 11 fabricated of any of these materials should be suitably insulated by means such as pads 20 from its pedestal 21. It may be seen that in some structures a suitable tank 11 may be provided with conventional top and bottom walls 15 and 14 and polymeric cylindrical walls 12. It may also be seen that linings of polymeric materials having high charge and other characteristics set out above may be used on conventional type constructions to similar advantage. It has been found that linings of polytetraflourethylene having heat resistivity of 550° F. and dielectric of about 2.5 (at $10^3$ cyc) over conventional tank walls accomplishes the objects of this invention, and further provides a coating resistant to scouring and abrasion.

It may be seen that exhaust gas may be cooled by any of a variety of design options to temperature wherein phoresis is high while protecting the polymeric walls of the tank 11. These temperatures will depend upon the heat resistivity characteristic of the polymeric material employed in the tank construction.

The flow of gases through the scrubber or other gas separators tends to charge the polymeric walls of the tank with a strong negative charge. Steam introduced by the injection 17, and heated particulates entering from the duct 15 tend to have a strong positive charge. This condition results in some particles in the air stream entering the tank enclosure to contact the walls thereof. The charge differential between the tank walls and steam and particulates will cause attraction of the two sets of molecules. Agglomeration of molecular material will also tend to occur between particulates to make the particulates and molecules of steam larger and heavier, resulting in precipitation to the bottom of the tank 11.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. In a steam scrubber including upstanding cylindrical walls, a flat, horizontally disposed enclosure wall fastened to the uppermost terminal end of said cylindrical walls, and downwardly projecting cone-shaped walls fastened to the lowermost terminal end of said cylindrical walls, said steam scrubber provided with a steam conduit dependingly mounted from said tank enclosure wall, said steam conduit having a multiplicity of suitably disposed exitways closed at the bottom and connected to steam source and said steam scrubber tank having an inlet conduit disposed at a tangent to said steam scrubber and an exitway duct disposed distally from the uppermost terminal end of said steam scrubber cylindrical walls, the improvement of an electrostatic tank construction for steam scrubbers wherein said walls of said tank are fabricated of polymeric material of high electrostatic potential and low heat deformation.

2. The apparatus of claim 1 wherein said tank is fabricated with polymeric cylindrical walls.

3. The apparatus of claim 1 wherein said polymeric material is applied to a rigid, non-polymeric tank-like enclosure.

4. The apparatus of claim 3 wherein said material coating said walls is polytetraflourethylene.

* * * * *